(12) United States Patent
Matsumoto et al.

(10) Patent No.: US 8,164,574 B2
(45) Date of Patent: Apr. 24, 2012

(54) TOUCH PANEL INPUT SYSTEM FOR VEHICLE

(75) Inventors: Yuuji Matsumoto, Chiryu (JP); Yuji Sato, Kariya (JP); Toshiyuki Ito, Toyohashi (JP); Tetsuya Oki, Kariya (JP)

(73) Assignee: Denso Corporation, Kariya (JP)

( * ) Notice: Subject to any disclaimer, the term of this patent is extended or adjusted under 35 U.S.C. 154(b) by 772 days.

(21) Appl. No.: 11/798,183

(22) Filed: May 10, 2007

(65) Prior Publication Data

US 2007/0262970 A1   Nov. 15, 2007

(30) Foreign Application Priority Data

May 12, 2006   (JP) .................................. 2006-133879

(51) Int. Cl.
*G09G 3/36* (2006.01)
*G06F 3/041* (2006.01)
(52) U.S. Cl. ...................................... 345/173; 345/102
(58) Field of Classification Search ........... 345/173–184; 701/1–3
See application file for complete search history.

(56) References Cited

U.S. PATENT DOCUMENTS

| | | | |
|---|---|---|---|
| 6,008,800 A * | 12/1999 | Pryor ............................ | 345/173 |
| 6,198,475 B1 | 3/2001 | Kunimatsu et al. | |
| 6,725,064 B1 * | 4/2004 | Wakamatsu et al. .......... | 455/566 |
| 7,084,859 B1 * | 8/2006 | Pryor ............................ | 345/173 |
| 2002/0021287 A1 * | 2/2002 | Tomasi et al. ................ | 345/168 |
| 2003/0096594 A1 * | 5/2003 | Naboulsi ....................... | 455/411 |
| 2003/0098803 A1 * | 5/2003 | Gourgey et al. ................ | 341/21 |
| 2004/0195031 A1 * | 10/2004 | Nagasaka ..................... | 180/271 |
| 2005/0078085 A1 * | 4/2005 | Casebolt et al. .............. | 345/156 |
| 2005/0134117 A1 * | 6/2005 | Ito et al. ........................ | 307/10.1 |
| 2006/0060658 A1 * | 3/2006 | Proffitt et al. ................ | 236/1 C |
| 2007/0262965 A1 * | 11/2007 | Hirai et al. ................... | 345/173 |

FOREIGN PATENT DOCUMENTS

| | | |
|---|---|---|
| JP | A-5-046313 | 2/1993 |
| JP | 7-319623 | 12/1995 |
| JP | A-10-269012 | 10/1998 |
| JP | A-2001-033200 | 1/2002 |
| WO | WO 2006027924 A1 * | 3/2006 |

\* cited by examiner

*Primary Examiner* — Chanh Nguyen
*Assistant Examiner* — Sanghyuk Park
(74) *Attorney, Agent, or Firm* — Posz Law Group, PLC

(57) ABSTRACT

An input operation system for use in a vehicle has a protruding marking on a surface of a touch panel, and displays a composite image generated by superposing an outline of user's finger on a switch operation screen. The composite image of the switch operation screen is backed by an image of the protruding marking on the surface of the touch panel, and the user's finger receives a tactile feedback from the protruding marking on the surface of the touch panel to cause sensations of an intuitive positioning in the switch operation screen for controlling a menu item that is displayed on a display unit for an input operation of vehicular devices.

12 Claims, 6 Drawing Sheets

TOUCH PANEL INPUT SYSTEM FOR VEHICLE

CROSS REFERENCE TO RELATED APPLICATION

This application is based on and claims the benefit of priority of Japanese Patent Application No. 2006-133879 filed on May 12, 2006, the disclosure of which is incorporated herein by reference.

FIELD OF THE INVENTION

The present invention generally relates to an input operation system for use in a vehicle.

BACKGROUND INFORMATION

In recent years, various techniques are disclosed for easily locating a button in a switch operation screen displayed on a touch sensitive panel of a display unit. For example, Japanese patent document JP-A-H07-319623 discloses a touch panel that has a transparent sheet disposed thereon with a protrusion for indicating a button position. Further, Japanese patent document JP-A-H10-269012 discloses an apparatus including a touch panel for sensing a touching finger of a user in combination with a display unit for displaying a switch operation screen with a superposed outline of a touching finger image. The outline image of the touching finger is derived from imaging the touching finger actually touching the separately positioned touch panel for providing a no-lookaway operability of the switch operation screen on the touch panel.

The disclosure in Japanese patent document JP-A-H07-319623 improves user operability for indicating the button position in the switch operation screen by having the transparent sheet on the touch panel. However, when menus in the switch operation screen is hierarchically structured and variably arranged for controlling, for example, a navigation system, having plural transparent sheets for accommodating respective menus is difficult.

Further, the disclosure in Japanese patent document JP-A-H10-269012 not only requires the protrusion on the surface of the touch panel, but also requires an associated operation of the touch panel and the switch operation screen due to its separate positioning of the display unit away from the touch panel. In addition, a flat surface of the touch panel without any positioning structure for the touching finger requires user's look and attention distracted away from a traveling direction of a vehicle, thereby deteriorating the operability of the touch panel.

SUMMARY OF THE INVENTION

In view of the above and other problems, the present invention provides an input operation system that provides an improved operability for a user who uses a touch panel for controlling vehicular devices in a vehicle.

In one aspect of the present invention, the input operation system for use in a vehicle includes a touch panel that senses a touching finger of a user, an imaging unit that images the touch panel, an outline extraction unit that extracts an outline image of the touching finger of the user based on an image of the touch panel, an image generation unit that generates a composite image by superposing the outline image of the touching finger extracted by the outline extraction unit on a switch operation screen, and a display control unit that displays the composite image generated by the image generation unit on a display panel. The touch panel of the input operation system has a touch sensitive surface having a protrusion disposed thereon, and the image generation unit generates the composite image by superposing the outline image of the touching finger on the switch operation screen that is backed by an image of the protrusion. In this manner, the protrusion on the surface of the touch panel is displayed as a background of the switch operation screen, thereby enabling the user to intuitively position the touching finger relative to a menu item of the switch operation screen without looking at the touch panel for an improved operability In another aspect of the present invention, the touch panel is automatically lit up by a backlight after a certain period of out-of-contact condition with a vehicular device such as a steering wheel or the like, thereby enabling the user to easily located the touch panel, based on an assistance of an operation detection unit and a lamp control unit for detecting the condition and controlling the backlight.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
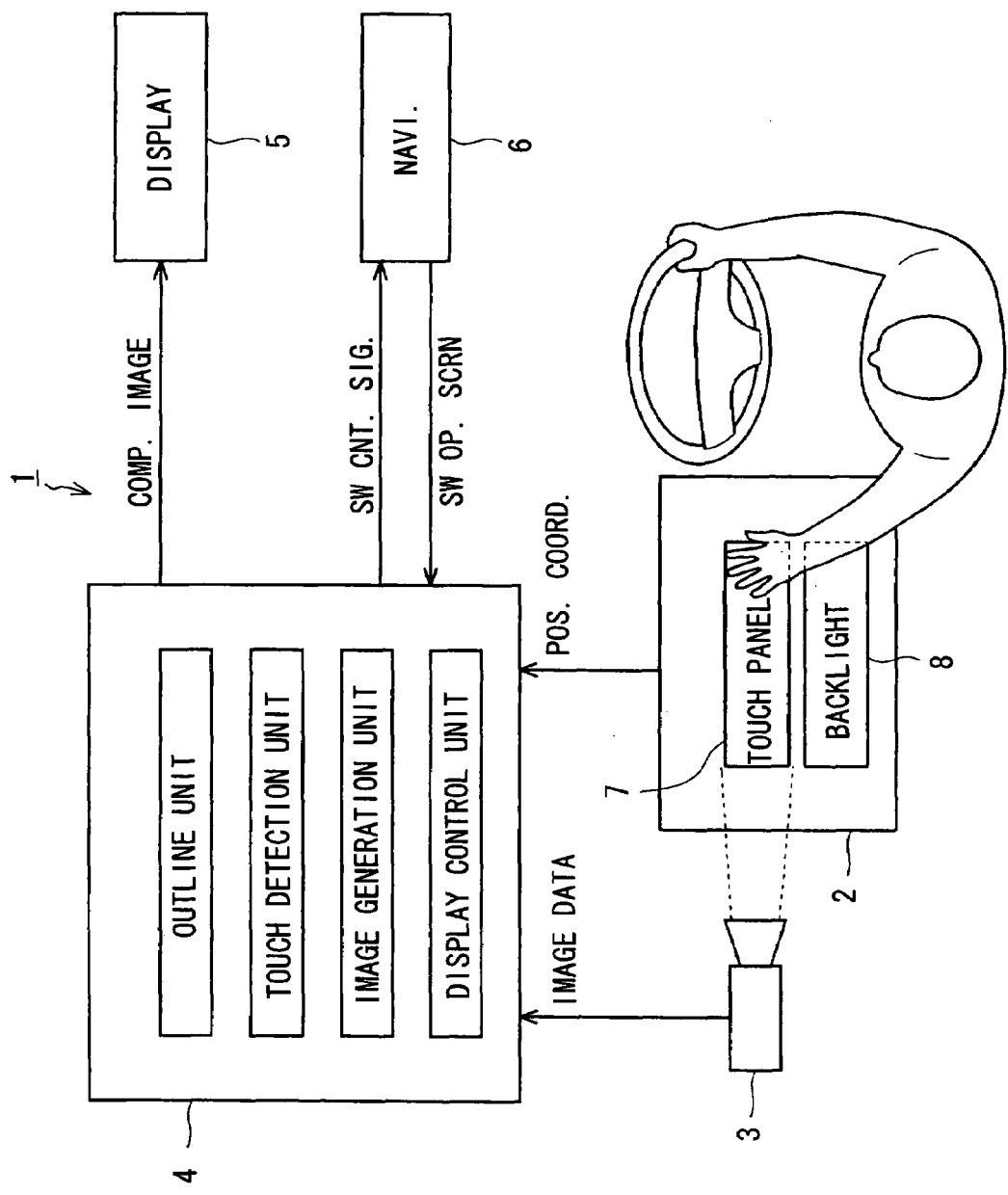
FIG. 1 shows a block diagram of an input operation system in an embodiment of the present disclosure.

Embodiments of the present invention will now be described with reference to the accompanying the drawings.

A first embodiment of an input operation system 1 in the present disclosure is described with reference to FIGS. 1 to 4B. The input operation system 1 is for use in a vehicle. The system 1 includes a touch switch 2, a camera 3, a control unit 4, a display 5, and a navigation unit 6.

Figure 2A:
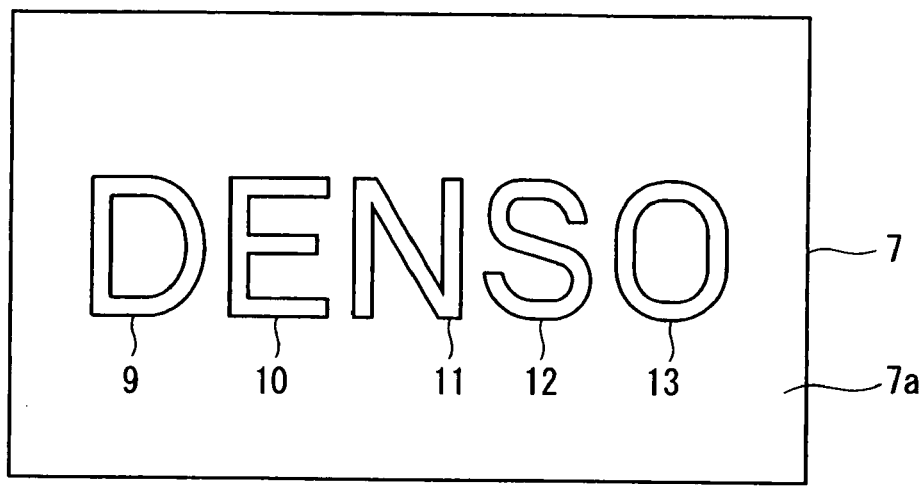
FIGS. 2A and 2B show illustrations of a touch panel of the input operation system.

The touch switch 2 includes a touch panel 7 for sensing a touching finger of a user, and a backlight 8 for lighting the touch panel 7. The touch switch 2 is, for example, disposed on a center console or the like for an access by the user in a driving position with his/her left hand without releasing a right hand from a steering wheel. When the touch switch 2 is sensing the touching finger, the switch 2 outputs, to the control unit 4, position coordinates that represents a position of the touching finger on the touch panel 7. In this case, a sensing surface 7a of the touch panel 7 has a logotype of DENSO formed thereon as shown in FIG. 2A. The logotype of 'D''E''N''S''O' is formed in a protruding manner on the surface 7a, and respective letters of 'D' 9, 'E' 10, 'N' 11, 'S' 12, 'O' 13 (protrusions 9-13) have a predetermined protrusion amount that does not obstruct smooth transitional movement of the touching finger on the surface 7a.

The camera 3 is a CCD camera, CMOS camera or the like in the present embodiment, and is disposed on a roof in the vehicle, a back of an instrument panel/a backlight 8 or the like. In this manner, the camera 3 images an entire area of the touch panel 7, and outputs image data to the control unit 4. The camera 3 may also be an infrared camera or the like.

The display 5 is, for example, a liquid crystal display positioned in a normal forward view of a driver, and displays a composite image that is inputted from the control unit 4. The size of the display 5 is preferably the same as the size of the touch panel 7. The navigation unit 6 outputs a switch operation screen such as a menu screen, a destination setting screen, a search screen or the like to the control unit 4, and performs an operation according to a switch control signal from the control unit 4 when the switch control signal is provided.

The control unit 4 includes a CPU, a RAM, a ROM and other components, and the respective components perform their own function for rendering functions of an outline extraction processing module, a touch detection processing module, a composite image generation processing module, and a display control processing module. In this manner, the control unit 4 controls an entire operation of the input operation system 1. More practically, the control unit 4 executes the outline extraction processing module upon having an input of the image data from the camera 3, and extracts an outline of the touching finger of the user's hand based on the image of the user's hand. The image of the touching finger of the user's hand is processed by using, for example, Chromakey process. In this case, the surface color of the touch panel 7 is set to have the color of blue as a complementary color of skin, and the backlight 8 lights the touch panel 7. In this manner, an influence of ambient light is decreased.

Figure 2B:
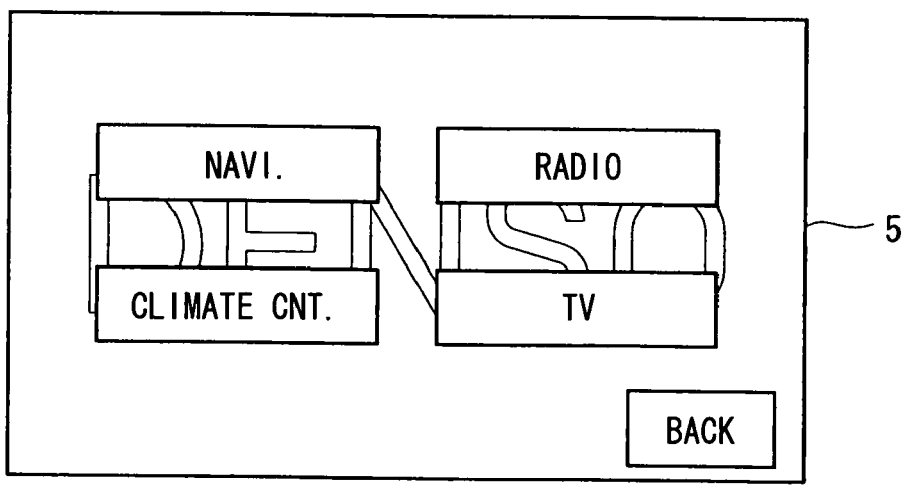

The control unit 4 executes the touch detection processing module upon having an input of the position coordinates of the touching finger from the touch switch 7 for detecting a touching position of the user's hand. Further, the control unit 4 executes the composite image generation module for generating a composite image of the switch operation screen by having the outline image of the touching finger superposed on the switch operation screen with the DENSO logo background. That is, the composite image displays the positions of the protrusions 9-13 on the surface 7a of the touch panel 7 as a background image of the switch operation screen. Then, the control unit 4 executes the display control processing module to display the composite image on the display 5 as shown in FIG. 2B. In this case, the positions (i.e., the coordinates) of the protrusions 9-13 of the DENSO logo in the touch panel 7 are substantially same as the positions (i.e., the coordinates) of a display position of the DENSO logo on the display 5.

Figure 3A:
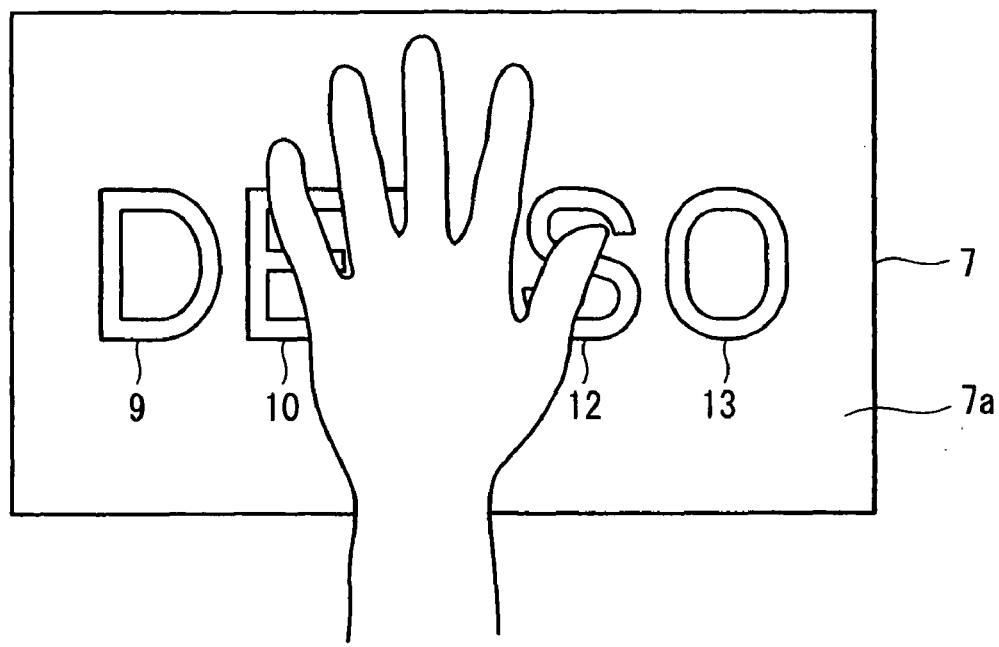
FIGS. 3A and 3B show illustrations of the touch panel under control of a user's hand and an outline image superposed on a switch operation screen.
Figure 3B:
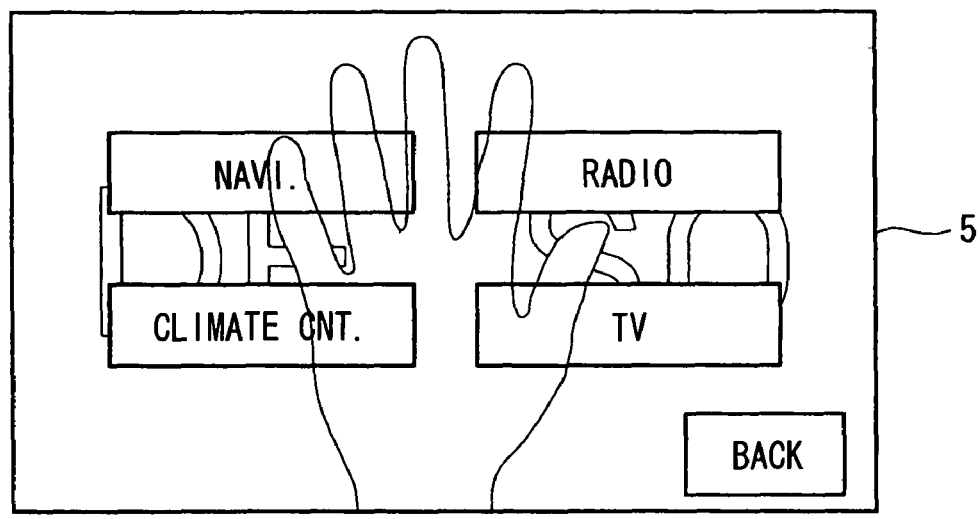

When the protrusions 9-13 on the surface 7a of the touch panel 7 are displayed as the background image of the switch operation screen, the user is enabled to have a tactile feedback from the touching finger on the touch panel 7 without actually looking at the touch panel 7 as shown in FIGS. 3A and 3B. More practically, the DENSO logo in the background image provides the user with a clue for positioning the touching finger at a right controlling position of respective menu items on the switch operation screen relative to the position of protrusions 9-13 formed on the surface 7a of the touch panel 7.

Figure 4A:
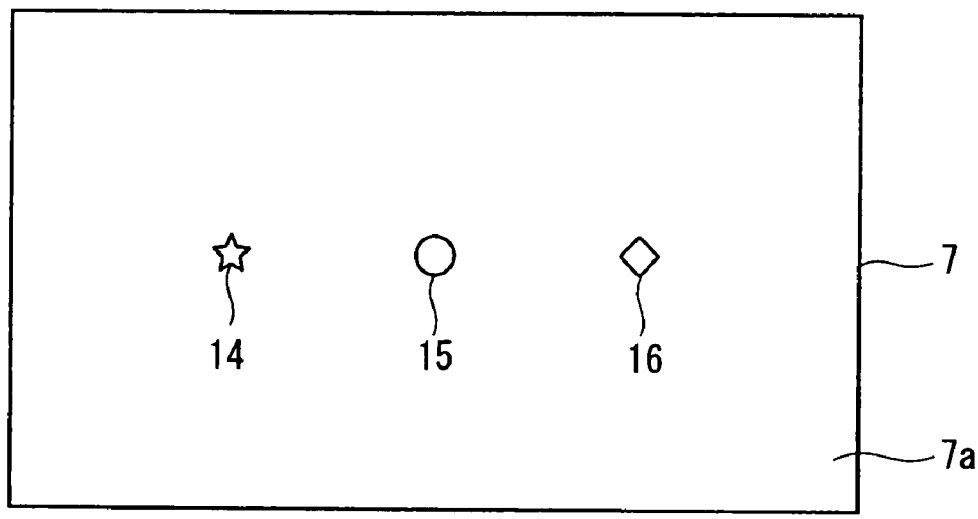
FIGS. 4A and 4B show illustrations of the touch panel with markers formed thereon.
Figure 4B:
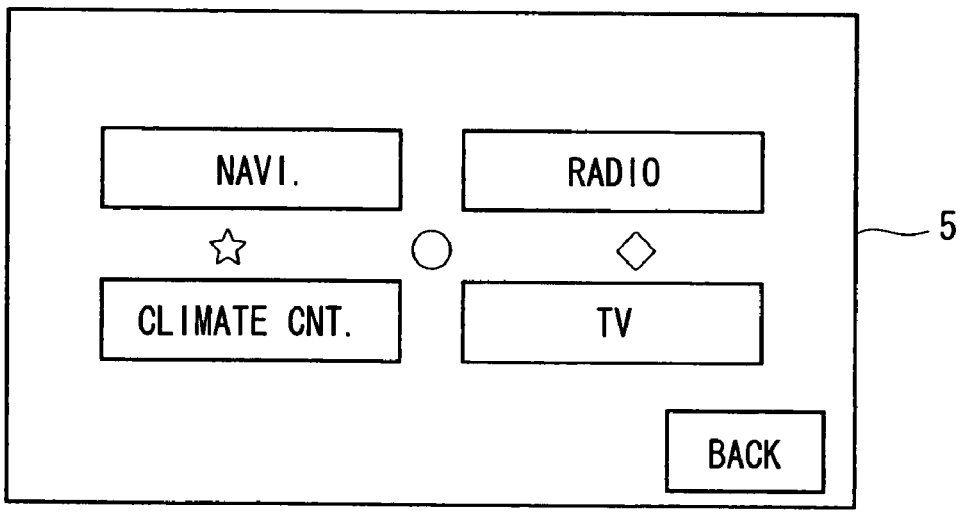

The protrusions 9-13 formed on the surface 7a of the touch panel 7 may be replaced with marking protrusions 14-16 of a star, a disk, and a square as shown in FIG. 4A. In this case, the background image of the switch operation screen in the composite image is changed to the background image with corresponding shapes of the marking protrusions 14-16 as shown in FIG. 4B.

Further, the positions of the protrusions 9-16 in the image derived from the camera 3 may be utilized for accurately positioning the outline image of the user's hand in the composite image based on an analysis that compares the positions of the protrusions 9-16 in the image data from the camera 3 with the positions of the protrusions 9-16 in the composite image outputted to the display 5. In this case, the colors of the protrusions 9-16 may be changed from the surface color of the touch panel 7 for securely extracting the positions of the protrusions 9-16.

The advantage of the input operation system 1 in the present embodiment is summarized in the following. That is, the input operation system 1 for use in the vehicle has the protrusions 9-16 on the surface 7a of the touch panel 7 in association with the protrusion-marked background image of the switch operation screen in the composite image, thereby providing the user with an improved operability based on an intuitive tactile feedback from the touching finger for positioning respective menu items in the touch panel 7 without a glance. Further, the protrusions 9-16 formed on the surface 7a of the touch panel 7 provides an aesthetic improvement by being in an industrially and ergonomically reasonable shape.

Figure 5:
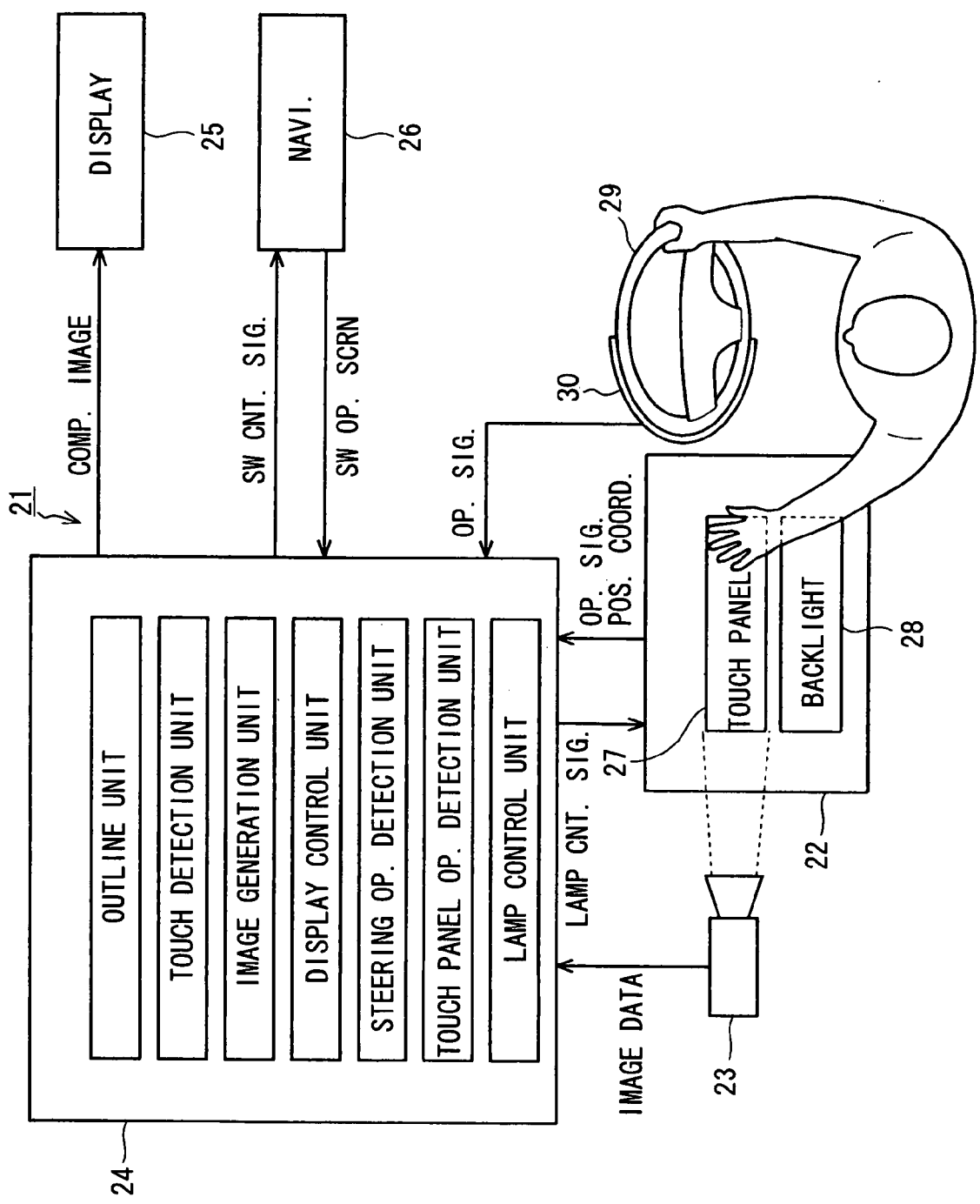
FIG. 5 shows a block diagram of the input operation system in another embodiment of the present disclosure.
Figure 6:
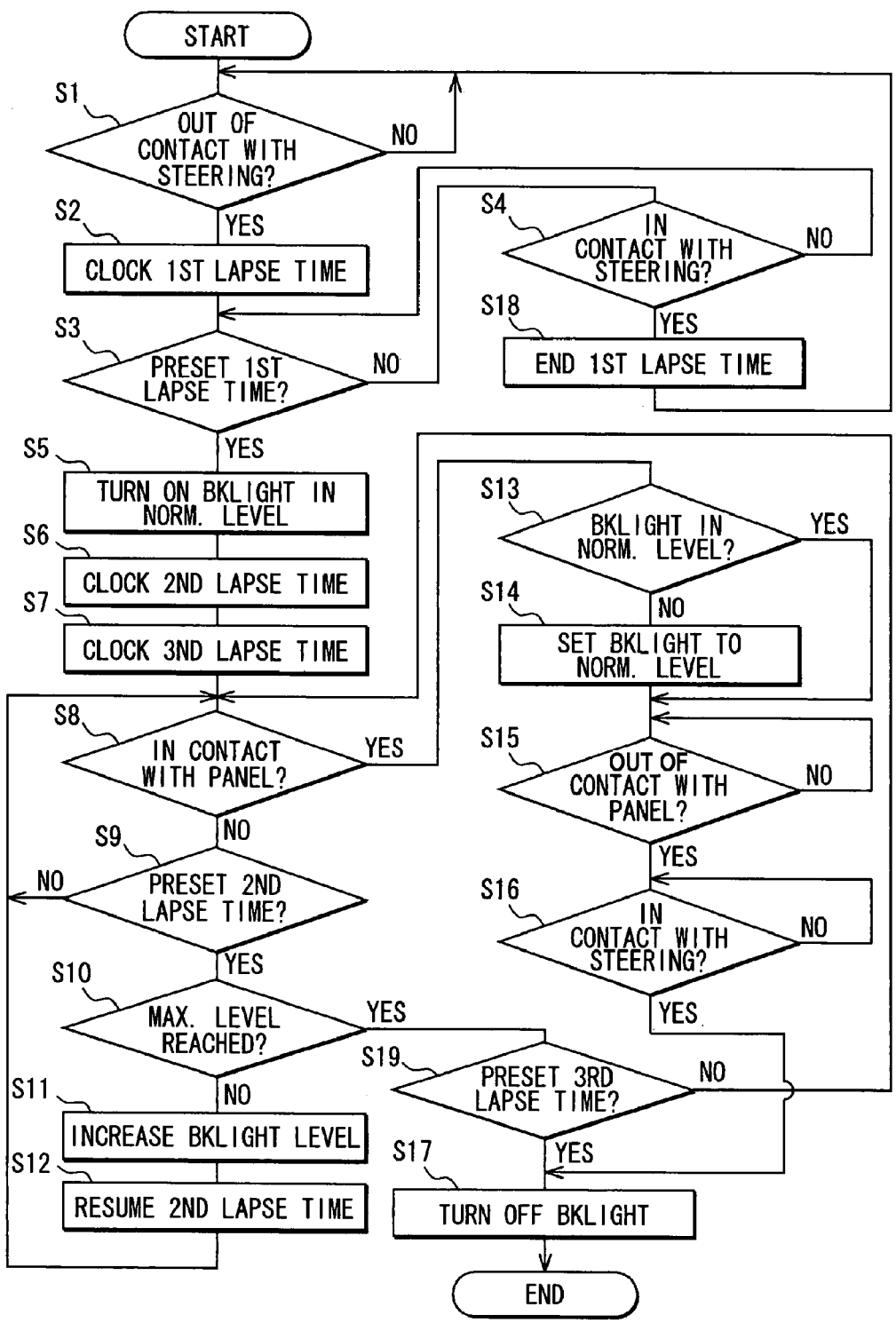
FIG. 6 shows a flowchart of a control process of the input operation system in the another embodiment of the present disclosure.

A second embodiment of the present disclosure is described with reference to FIGS. 5 and 6. The description of the second embodiment is mainly focused to the difference of the second embodiment relative to the first embodiment. An input operation system 21 in the present embodiment includes a touch switch 22, a camera 23, a control unit 24, a display 25, and a navigation unit 26.

The touch switch 22 includes a touch panel 27 and a backlight 28, and outputs to the control unit 24 an operation detection signal that represents either of an in-contact condition or an out-of-contact condition of the touching finger of the user with the touch panel 27. The touch panel 27 also outputs contact position coordinates of the touching finger to the control unit 24 when the touching finger is touching the touch panel 27. The touch switch 22 lights itself by the backlight 28 according to a lamp control signal upon having an input of the lamp control signal from the control unit 24.

A steering wheel 29 for steering the vehicle has an operation detection sensor 30 for detecting an in-contact condition and an out-of-contact condition of the touching finger with the steering wheel 29. The operation detection sensor 30 outputs an operation detection signal that represents respective contact conditions of the touching finger of the user with the steering wheel 29 to the control unit 24.

The control unit 24 executes a steering operation detection module, a touch panel operation detection module, and a lamp control module beside executing other modules described in the first embodiment. The control unit 24 determines whether the touching finger of the user is in the in-contact or the out-of-contact condition with the steering wheel 29 by executing the steering operation detection module for analyzing the operation detection signal from the operation detection sensor 30, and also determines whether the touching finger of the user is in the in-contact or the out-of-contact condition with the touch panel 22 by executing the touch panel operation detection module for analyzing the operation detection signal from the touch switch 22. Further, the control unit 24 controls lighting operation of the backlight 28 by executing the backlight control module.

A control process of the input operation system 21 in the present embodiment is described with reference to a flowchart in FIG. 6.

The control unit 24 determines whether the touching finger of the user has lost contact with the steering wheel 29 in step S1, and start a clock to measure a first lapse time in step S2 when the user is out of contact with the steering wheel 29 is detected (step S1:YES) based on the operation detection signal from the detection sensor 30. Then, in step S3, whether a preset first lapse time has passed is determined, and whether the touching finger of the user is touching the steering wheel 29 again is determined in step S4.

When the control unit 24 detects that the preset first lapse time has passed before detecting the contact of the touching finger of the user with the steering wheel 29 (step S3:YES), that is, when the out-of-contact condition of the touching finger with the steering wheel 29 has exceeded the preset first lapse time, the control unit 24 outputs the lamp control signal to the touch switch 22 for turning on the backlight 28 to a normal level of brightness in step S5. Then, the control unit 24 starts the clock to measure a second and third lapse time in steps S6 and S7, and determines whether the touching finger has contacted the touch panel 27 in step S8 as well as determines whether the preset second lapse time has passed in step S9. In this case, the present third lapse time is configured to be longer than the preset second lapse time.

When the control unit 24 detects that the preset second lapse time has passed before detecting the contact of the touching finger of the user with the touch panel 27 (step S8:YES), that is, when the out-of-contact condition of the touching finger with the touch panel 27 after turning-on of the backlight 28 in the normal level of brightness has exceeded the preset second lapse time, the control unit 24 determines whether the brightness of the backlight 28 has reached the maximum level in step S10, and increases the brightness of the backlight 28 by one level in step S11 upon detecting that the brightness of the backlight 28 has not reached the maximum level (step S10:NO). Then, the control unit 24 resumes measurement of the second lapse time in step S12, and returns to step S8 for continuing the control process.

When the control unit 24 detects that the touching finger of the user has contacted the touch panel 27 before the elapse of the preset second lapse time (step S8:YES), that is, when the user has contacted the touch panel 27 with the touching finger before the elapse of the preset second time after turning-on of the backlight 28 in the normal level of brightness, the control unit determines the brightness level of backlight 28 at the time of the detection of the contact with the touch panel in step S13. When the brightness level of the backlight 28 is not in the normal level (step S13:NO), the control unit 24 puts the brightness level of the backlight 28 back to the normal level in step S14.

Then, the control unit 24 determines whether the touching finger of the user has lost contact with the touch panel 27 in step S15 and whether the touching finger of the user has contacted with the steering wheel in step S16, and concludes the input system control process with turning-off of the backlight 28 in step S17 after having a determination result in step S15 that the user has lost contact with the touch panel 17 (step S15:YES) and a determination result in step S16 that the user has contacted the touching finger with the steering wheel 29 (step S16:YES).

The advantage of the second embodiment of the input operation system 21 is summarized in the following. That is, the operation system 21 lights the touch panel 27 with the backlight 28 lit in the normal brightness level after the preset first lapse time of the loss of the contact of the touching finger with the steering wheel 29, thereby providing an improved operability of the touch panel in terms of positioning the touch panel 27 without causing a look-away from a front direction of the vehicle, or with a minimum amount of a look-away from the front direction. Further, the brightness of the backlight 28 is configured to be back to the normal level after the preset second lapse time of the out-of-contact condition of the touching finger with the touch panel 27 for suppressing unnecessary battery consumption. Furthermore, unnecessary battery consumption is further suppressed by having the preset third lapse time for turning off the backlight upon detecting the out-of-contact condition of the touching finger with the touch panel or upon detecting the combined conditions of the loss-of-contact with the touch panel 27 and the contact with the steering wheel 29 by the touching finger.

Although the present invention has been fully described in connection with the preferred embodiment thereof with reference to the accompanying drawings, it is to be noted that various changes and modifications will become apparent to those skilled in the art.

For example, the control units 1 and 21, the displays 5 and 25, the navigation units 6 and 26 may be integrally formed as a navigation system of the vehicle.

The logos and protrusions in the first embodiment may have other forms and other quality.

The operation detection sensor may be provided on a shift knob in the second embodiment, and the backlight control may be provided based on the in- and out-of-contact conditions of the touching finger with the shift knob in combination with the contact conditions with the steering wheel.

Such changes and modifications are to be understood as being within the scope of the present invention as defined by the appended claims.

What is claimed is:

1. An input operation system for use in a vehicle comprising:
    a touch panel that senses a touching finger of a user;
    an imaging unit that images the touch panel;
    an outline extraction unit that extracts an outline image of the touching finger of the user based on an image of the touch panel;
    an image generation unit that generates a composite image by superposing the outline image of the touching finger extracted by the outline extraction unit on a switch operation screen;
    a display control unit that displays the composite image generated by the image generation unit representation on a display panel;
    an operation detection unit that detects whether the touching finger of the user is in an in-contact condition or an out-of-contact condition with a vehicular device that controls vehicular equipment, the vehicular equipment being a steering wheel, the operation detection unit being disposed on the steering wheel;
    a lamp control unit that lights a lamp for increasing lighting of the touch panel to a predetermined brightness to notify the user of a location of the touch panel, when the operation detection unit detects an out of contact condition with the vehicular device that controls vehicular equipment for a period of time greater than a preset first lapse time; and
    a panel control detection unit that detects whether the user is in an in-contact condition or an out-of-contact condition with the touch panel by the touching finger of the user, wherein
    the lamp control unit continually increases the brightness of the lamp when a second lapse time has passed after lighting the lamp with the predetermined brightness without detection of the in-contact condition of the touching finger of the user with the touch panel by the panel control detection unit,
    the lamp control unit extinguishes the lamp when a third lapse time has passed after lighting the lamp with the predetermined brightness without a detection of the in-contact condition of the touching finger with the touch panel by the panel control detection unit, the third lapse time is longer than the second lapse time, the lamp control unit changes the brightness of the lamp to the predetermined brightness when the in-contact condition of the touching finger is detected by the panel control detection unit after increasing the brightness of the lamp, the lamp control unit extinguishes the lamp when both of a first condition and a second condition is detected, the first condition is defined as detection of the out-of-contact condition of the touching finger of the user with the touch panel by the panel control detection unit after detection of the in-contact condition of the touching finger of the user with the touch panel by the panel control detection unit, and the second condition is defined as a detection of the in-contact condition of the touching finger with the vehicular equipment by the operation detection unit.

2. The input operation system for use in a vehicle according to claim 1, comprising:

a display panel disposed at one position in the vehicle; wherein the touch panel that senses the touching finger of the user includes a touch sensitive surface having a position-marking protrusion disposed thereon, where the touch panel is disposed at a position separate from the display panel in the vehicle;

the switch operation screen includes menu items that can be selected by the user; and the image generation unit generates the composite image by superposing the outline image of the touching finger on the switch operation screen that is backed by an image of the position-marking protrusion, the position coordinates of the position-marking protrusion on the touch panel are substantially same as display coordinates of the image of the position-marking protrusion for displaying the composite image on the display panel, and the image of the position-marking protrusion on the display panel is outside the menu items of the switch operation screen, further wherein the position-marking protrusion on the touch screen does not represent the menu items on the switch operation screen.

3. The input operation system of claim 2, wherein the position-marking protrusion is a readable alphabet character string.

4. The input operation system of claim 2, wherein the position-marking protrusion is a horizontal arrangement of geometrical figures.

5. The input operation system of claim 2, wherein the position-marking protrusion is displayed by using a different color that is different from a touch panel surface color in the composite image.

6. The input operation system of claim 2, wherein the position-marking protrusion is formed in a height that allows smooth finger movement on the touch panel.

7. The input operation system of claim 1, wherein the operation detection unit further being disposed on a shift knob of the vehicle, wherein the touching finger is determined to be in the in-contact condition and out-of-contact condition with the vehicular device based on the shift knob in combination with the steering wheel.

8. The input operation system of claim 1, wherein the operation detection unit further measures time, and determines from the time which is measured whether the preset first lapse time has passed.

9. The input operation system of claim 8, wherein the operation detection unit further measures time, and determines from the time which is measured whether the second lapse time has passed.

10. The input operation system of claim 8, wherein the operation detection unit further measures time, and determines from the time which is measured whether the third lapse time has passed.

11. The input operation system of claim 10, wherein the operation detection unit further measures time, and determines from the time which is measured whether the third lapse time has passed.

12. The input operation system of claim 1, wherein the lamp control unit continually increases the brightness of the lamp from the predetermined brightness until reaching a predetermined maximum, when a second lapse time has passed.

* * * * *